United States Patent

Ohnishi et al.

(10) Patent No.: US 10,479,112 B2
(45) Date of Patent: Nov. 19, 2019

(54) PRINTING DEVICE AND PRINTING METHOD

(71) Applicant: MIMAKI ENGINEERING CO., LTD., Nagano (JP)

(72) Inventors: Masaru Ohnishi, Nagano (JP); Toshiya Otsuka, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/114,260

(22) Filed: Aug. 28, 2018

(65) Prior Publication Data

US 2019/0070868 A1 Mar. 7, 2019

(30) Foreign Application Priority Data

Sep. 5, 2017 (JP) .................................. 2017-170057

(51) Int. Cl.
| | |
|---|---|
| *B41J 11/00* | (2006.01) |
| *B41J 2/165* | (2006.01) |
| *B41J 2/21* | (2006.01) |
| *C09D 11/101* | (2014.01) |

(52) U.S. Cl.
CPC ............ *B41J 11/002* (2013.01); *B41J 2/165* (2013.01); *B41J 2/2107* (2013.01); *C09D 11/101* (2013.01)

(58) Field of Classification Search
CPC ........ B41J 11/002; B41J 2/2107; B41J 2/165; C09D 11/101
See application file for complete search history.

(56) References Cited

U.S. PATENT DOCUMENTS

| | | | |
|---|---|---|---|
| 2007/0064077 A1 | 3/2007 | Konno | |
| 2012/0154498 A1* | 6/2012 | Chiwata | B41J 11/0015 347/102 |
| 2013/0044171 A1 | 2/2013 | Sasaki et al. | |
| 2014/0015893 A1* | 1/2014 | Marcus | B41J 2/105 347/20 |
| 2017/0334217 A1* | 11/2017 | Yoshinuma | B41J 11/0015 |

FOREIGN PATENT DOCUMENTS

| | | |
|---|---|---|
| JP | 2017128039 | 7/2017 |
| WO | 2004094150 | 11/2004 |

OTHER PUBLICATIONS

"Search Report of Europe Counterpart Application", dated Feb. 1, 2019, p. 1-p. 9.

* cited by examiner

*Primary Examiner* — Yaovi M Ameh
(74) *Attorney, Agent, or Firm* — JCIPRNET (57) ABSTRACT

There is provided a printing device that carries out printing with respect to a medium; the printing device including inkjet heads, which are ejection heads that eject an ink to the medium; and an infrared irradiating portion that irradiates an infrared light in which a wavelength is smaller than or equal to 3 μm with respect to the ink on the medium; where the inkjet heads eject the ink containing a solvent that generates heat by absorbing the infrared light; and the infrared irradiating portion volatilizes and removes at least one part of the solvent in the ink by irradiating the infrared light with respect to the ink on the medium.

9 Claims, 3 Drawing Sheets

PRINTING DEVICE AND PRINTING METHOD

CROSS REFERENCE TO RELATED APPLICATIONS

This application claims the priority benefit of Japanese Patent Application No. 2017-170057, filed on Sep. 5, 2017. The entirety of the above-mentioned patent application is hereby incorporated by reference herein and made a part of this specification.

TECHNICAL FIELD

The present disclosure relates to a printing device and a printing method.

DESCRIPTION OF THE BACKGROUND ART

Conventionally, an inkjet printer that carries out printing through an inkjet scheme has been widely used (see e.g., International Publication No. WO2004/094150). An evaporation drying ink that fixes to a medium (media) when a solvent in the ink is volatilized and removed is being widely used for the ink for the inkjet printer. Furthermore, a heater for heating the medium, and the like is being widely used as a means for drying the evaporation drying ink.
Patent Literature: International Publication No. WO2004/094150

SUMMARY

When using the evaporation drying ink, it is necessary to sufficiently dry the ink before smearing occurs on the medium. Thus, when using the heater for heating the medium, for example, it is usually necessary to carry out heating at a temperature of a certain extent or higher. However, various problems may arise when a heating temperature of the heater is raised. For example, in this case, when a nozzle surface of the inkjet head at a position facing the medium is heated, the ink near the nozzle surface may dry, and nozzle clogging and the like may easily occur. Furthermore, in this case, for example, use of a medium having low heatproof temperature may become difficult. Moreover, in order to suppress the smearing, for example, consideration is made to using a solvent of low boiling point, and the like for the solvent of the ink. In this case, however, the problem of nozzle clogging and the like easily arises even if the heating temperature of the heater is lowered.

When heating the medium while suppressing the temperature of the medium, consideration is made to setting the temperature of the heater to, for example, a range of about 40° C. to 60° C. However, in such low temperature drying condition, it is sometimes difficult to dry the ink at high speed. More specifically, for example, when carrying out a high speed printing, consideration is made to increasing a landing amount of the ink landing in a unit area in a unit time by reducing a pass number of printing. In such a case, it is sometimes difficult to suppress the smearing of the ink under the low temperature drying condition. Furthermore, for example, when using a permeable (absorbent) medium, the amount of ink perfused to the interior of the medium by capillary action may increase, and the amount of ink remaining on the surface of the medium or in the vicinity of the surface may reduce. In this case, the color of the print result (printed article) becomes light and may give a blurred image as the density of the print (print density) is lowered.

Furthermore, in order to suppress the smearing of the ink, for example, consideration is made to carrying out a pre-process such as coating of forming an image receiving layer of the ink on the medium. In this case, however, the printing is carried out only with respect to a specific medium, and the application of printing may be limited. Furthermore, a loss of time and increase in cost for the pre-process may become a problem. Thus, it has been conventionally desired to more appropriately dry the ink, and appropriately carry out printing at high quality. The present disclosure provides a printing device and a printing method capable of solving the problems described above.

An aqueous ink such as an aqueous pigment ink, an aqueous latex ink, and the like, for example, is being widely used for the evaporation drying ink. In the case of the aqueous ink, the solvent in the ink is relatively unlikely to evaporate, and hence the low viscosity state of the ink tends to continue for a long time on the medium, and the smearing is assumed to easily occur. The inventors of the present application considered, through thorough research, directly heating the ink by irradiating an infrared light with respect to the aqueous ink. In this case, however, if the infrared light is simply irradiated, the medium is also heated along with the ink, and problems similar to when heating the medium with the heater may arise. More specifically, for example, when a far infrared light, and the like widely used as the infrared light for heating is irradiated with respect to the ink on the medium, the medium may also be heated along with the ink. In this case, a wide range in the medium becomes a high temperature, and the problem of nozzle clogging, and the like may easily occur.

The inventors of the present application thus considered, through further thorough research, irradiating only the ink with a selectively heatable infrared light rather than simply irradiating the ink with the infrared light. More specifically, consideration was made to using an infrared light of a shorter wavelength instead of the far infrared light, and the like. Furthermore, the inventors found out, through experiments, and the like, that the ink can be appropriately dried without excessively raising the temperature of the medium by using an infrared light in which a wavelength is smaller than or equal to 3 μm. Moreover, the inventors found out that the smearing of the ink can be appropriately suppressed while appropriately preventing the nozzle clogging, and the like.

Furthermore, through further thorough research, the inventor of the present application found features necessary for obtaining such effects and contrived the present disclosure. In order to solve the problem described above, the present disclosure provides a printing device that carries out printing with respect to a medium; the printing device including an ejection head that ejects an ink to the medium; and an infrared irradiating portion that irradiates an infrared light in which a wavelength is smaller than or equal to 3 μm with respect to the ink on the medium; where the ejection head ejects the ink containing a solvent that generates heat by absorbing the infrared light; and the infrared irradiating portion volatilizes and removes at least one part of the solvent in the ink by irradiating the infrared light with respect to the ink on the medium.

When configured in such manner, for example, the ink can be appropriately heated without excessively raising the temperature of the medium. Thus, according to such configuration, for example, the ink can be dried before smearing occurs while preventing the occurrence of a problem caused by the temperature rise of the medium such as nozzle clogging. Thus, for example, printing at high quality can be appropriately carried out.

In the configuration, the infrared light in which a wavelength is smaller than or equal to 3 µm is, for example, a near infrared light or a short wavelength infrared light. Furthermore, irradiating the infrared light in which a wavelength is smaller than or equal to 3 µm means, for example, irradiating an infrared light in which the peak wavelength is smaller than or equal to 3 µm (e.g., 0.75 µm to 3 µm). Furthermore, in this case, the infrared irradiating portion preferably irradiates the infrared light so that the intensity at the wavelength distant from the peak wavelength becomes sufficiently small. More specifically, the infrared irradiating portion generates, for example, an infrared light in which the peak wavelength is smaller than or equal to 3 µm and the intensity of a component in which the wavelength is 4 µm becomes smaller than or equal to 1/10 of the intensity at the peak wavelength. Furthermore, in this configuration, the infrared irradiating portion includes, for example, a semiconductor light source that generates an infrared light. The semiconductor light source that generates the infrared light is, for example, an LED (infrared LED) that generates an infrared light, a laser element (infrared light LD) that generates an infrared light. For example, the infrared light of a wavelength range necessary for heating the solvent in the ink can be efficiently and appropriately generated by generating the infrared light with the semiconductor light source. Furthermore, in this case, the medium and the like can be more appropriately prevented from being heated to a high temperature by an infrared light of long wavelength, for example, by selectively generating the infrared light of a necessary wavelength.

Furthermore, in this configuration, the infrared irradiating portion directly and selectively heats the ink instead of indirectly heating the ink by way of the medium, for example, by irradiating the infrared light with respect to the ink on the medium. The infrared irradiating portion thus heats the ink so that, for example, a temperature of the ink on the medium becomes higher than a temperature of the medium. More specifically, the infrared irradiating portion heats the ink so that, for example, the temperature of the ink becomes higher than 50° C. while suppressing the temperature of the medium to lower than or equal to 50° C. Moreover, in this case, the temperature rise of the medium can be appropriately suppressed by directly and selectively heating the ink. For example, the temperature rise of the medium by the irradiation of the infrared light can be made to about lower than or equal to 10° C. Furthermore, the temperature rise of the medium by the irradiation of the infrared light is more preferably lower than or equal to 5° C.

In this configuration, the infrared irradiating portion increases the viscosity of the ink to at least a viscosity the smearing does not occur on the medium by sufficiently heating the ink by the irradiation of the infrared light. When referring to the smearing not occurring on the medium, for example, this means that the smearing in question substantially does not occur according to the quality and the like desired in the printing. In this case, the temperature of the ink is preferably heated to a sufficiently high temperature so that the solvent can be appropriately volatilized and removed in a short time. More specifically, the infrared irradiating portion may heat the ink on the medium to a temperature at which the solvent contained in the ink on the medium boils by irradiating the infrared light with respect to the ink on the medium. In this case, the temperature at which the solvent boils is, for example, boiling temperature or a higher temperature. Furthermore, when using an aqueous ink having water as a main component, the boiling point of the solvent is, for example, the boiling point of the water.

Furthermore, in the configuration, the solvent is, for example, a liquid used as a main component of the ink. The main component of the ink is, for example, a component contained in the ink at a largest weight ratio. Furthermore, an aqueous ink containing water as the solvent can be suitably used as the ink. In this case, the infrared irradiating portion generates, for example, an infrared light of a wavelength range that causes water to generate heat. Furthermore, the infrared light of a wavelength range that causes water to generate heat is an infrared light in which the peak wavelength is in the range of 2.65 µm to 2.87 µm or 1.86 µm to 1.94 µm. Furthermore, in this case, the medium in which the content of water is small is preferably used to suppress the temperature rise of the medium by the irradiation of the infrared light. In this case, for example, the medium and the like in which the proportion of water (moisture percentage) is smaller than or equal to 15% by weight (more preferably, smaller than or equal to 10% by weight) can be suitably used.

Consideration is also made to using a liquid other than water for the solvent of the ink. In this case, for example, a liquid containing a hydroxyl group such as alcohol can be suitably used. According to such configuration, for example, the ink can be appropriately heated by the irradiation of the infrared light. More specifically, in this case, the infrared irradiating portion preferably generates the infrared light in which the peak wavelength is in the range of 2.5 µm to 3.0 µm. The peak wavelength of the infrared light is more preferably 2.8 µm to 2.9 µm (e.g., about 2.86 µm). According to such configuration, for example, the ink on the medium can be appropriately heated.

Consideration can be made to using a printing method having features similar to the above, and the like for the configuration of the present disclosure. In this case as well, for example, effects similar to the above can be obtained.

According to the present disclosure, for example, printing at high quality can be appropriately carried out.

BRIEF DESCRIPTION OF THE DRAWINGS

FIGS. 1A and 1B are views showing one example of a printing device 10 according to one embodiment of the present disclosure.

FIGS. 2A and 2B are views describing an operation of printing carried out in the present example.

DETAILED DESCRIPTION OF EMBODIMENTS

Figure 1A:
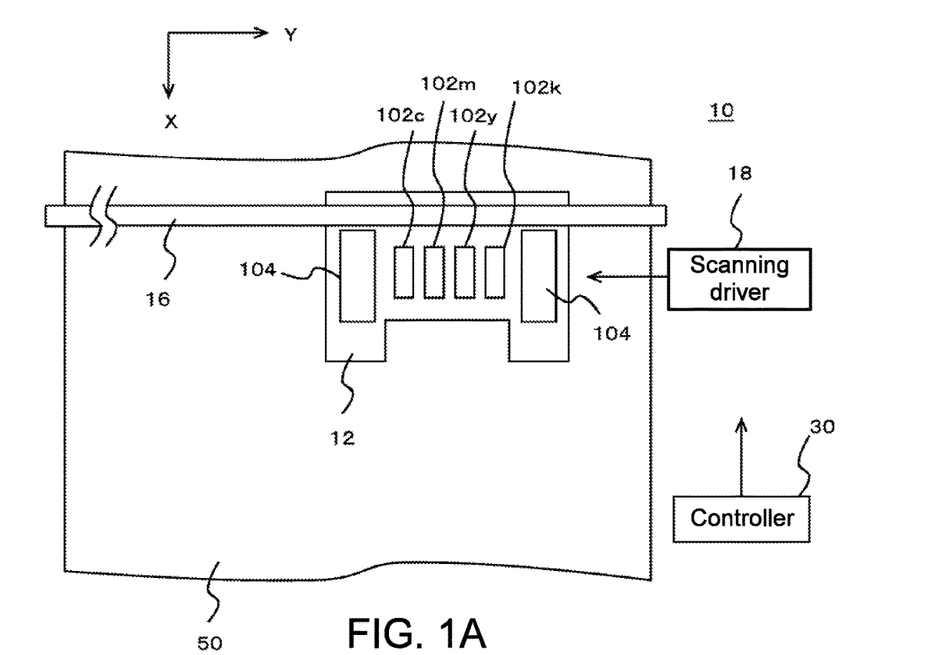
FIGS. 1A and 1B are a top view and a side cross-sectional view, respectively, showing one example of a configuration of a main part of the printing device 10 in a simplified manner.
Figure 1B:
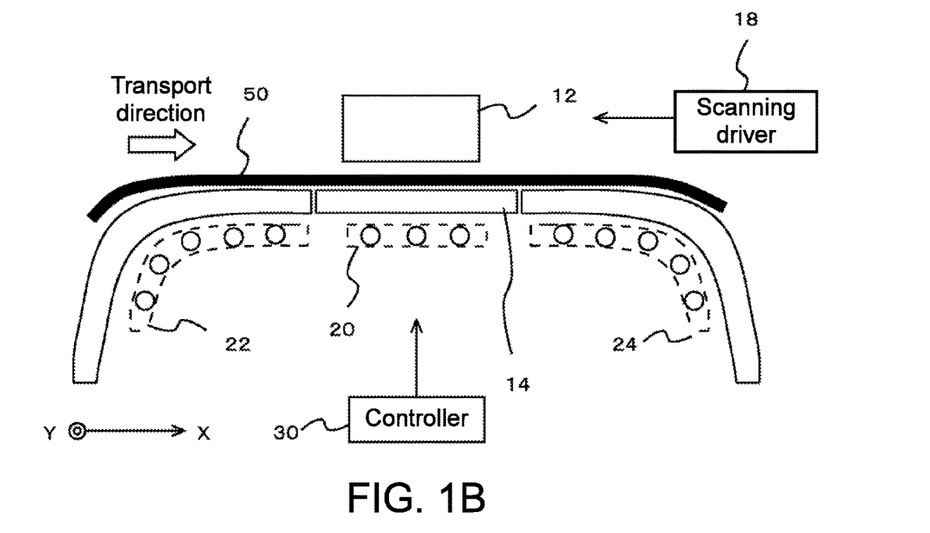

Hereinafter, an embodiment according to the present disclosure will be described with reference to the drawings. FIGS. 1A and 1B are views showing one example of a printing device 10 according to one embodiment of the present disclosure. FIGS. 1A and 1B are a top view and a side cross-sectional view, respectively, showing one example of a configuration of a main part of the printing device 10 in a simplified manner; Excluding the points described below, the printing device 10 may have features same as or similar to the known printing device. For example, in addition to the configuration described below, the printing device 10 may further include various configurations same as or similar to the known printing device.

In the present example, the printing device 10 is an inkjet printer (color inkjet printer) that carries out printing through an inkjet scheme with respect to a medium (media) 50 to be printed, and includes a head unit 12, a platen 14, a guide rail 16, a scanning driver 18, a print heater 20, a pre-heater 22, an after-heater 24, and a controller 30. The head unit 12 is a portion (IJ head unit) that ejects ink with respect to the medium 50, and includes a plurality of inkjet heads and a plurality of infrared irradiating portions 104. More specifically, in the present example, the head unit 12 includes, for the plurality of inkjet heads, an inkjet head 102c, an inkjet head 102m, an inkjet head 102y, and an inkjet head 102k (hereinafter referred to as inkjet heads 102c to 102k), as shown in FIG. 1A. The inkjet heads 102c to 102k are an example of an ejection head, and eject a color ink (colored ink) of each color for color printing. More specifically, the inkjet head 102c ejects an ink of cyan (C) color. The inkjet head 102m ejects an ink of magenta (M) color. The inkjet head 102y ejects an ink of yellow (Y) color. The inkjet head 102k ejects an ink of black (K) color. Each of the inkjet heads 102c to 102k includes a plurality of nozzles that eject the ink at a surface (nozzle surface) facing the medium 50. Furthermore, in the present example, the plurality of nozzles in each of the inkjet heads 102c to 102k are lined in a nozzle row direction parallel to an X direction set in advance in the printing device 10. Furthermore, the inkjet heads 102c to 102k are arranged side by side in a Y direction orthogonal to the X direction with the respective positions in the X direction aligned, as shown in the figure. In this case, the X direction is a direction parallel to a sub-scanning direction of relatively moving the head unit 12 with respect to the medium 50 at the time of a sub-scanning operation, to be described later. The Y direction is a direction orthogonal to the X direction. Furthermore, in the present example, the Y direction is a direction parallel to a main scanning direction of relatively moving the head unit 12 with respect to the medium 50 at the time of a main scanning operation. In this case, the main scanning operation is, for example, an operation of ejecting the ink while moving in the main scanning direction.

In the present example, an evaporation drying ink is used for the color ink ejected from the inkjet heads 102c to 102k. Furthermore, an ink in which that the ink itself generates heat by the irradiation of an infrared light is used for the evaporation drying ink. In this case, for example, the ink can be appropriately dried in a short time by irradiating the infrared light with respect to the ink attached to the medium 50. Furthermore, for example, the ink thus can be appropriately dried before the smearing of the ink occurs. The features of the ink used in the present example will be described in further detail later.

The plurality of infrared irradiating portions 104 in the head unit 12 are infrared irradiating means that generate an infrared light for causing the ink to generate heat. Furthermore, in the present example, the plurality of infrared irradiating portions 104 are arranged on one side and other side of the Y direction with respect to the arrangement of the inkjet heads 102c to 102y with the positions in the X direction aligned with the inkjet heads 102c to 102y. Furthermore, with respect to the ink attached to the medium 50 at the time of each main scanning operation, the infrared irradiating portion 104 irradiates an infrared light with respect to the ink immediately after landing (immediately after inkjet print). The irradiation of the infrared light by the infrared irradiating portion 104 is preferably even at least in a range of a width (ejection width) in the sub-scanning direction of a range in which the ink is ejected within the same main scanning operation (pass). In this case, for example, the infrared light is irradiated from the infrared irradiating portion 104 on the backward side of the inkjet heads 102c to 102y in the moving direction of the head unit 12, so that the infrared light is irradiated with respect to the ink immediately after landing on the medium 50, and the viscosity of the ink can be sufficiently increased before the smearing of the ink occurs.

Furthermore, in the present example, the infrared irradiating portion 104 includes a semiconductor light source that generates an infrared light in an intensity distribution having a predetermined peak wavelength (center of light emission). According to such configuration, for example, the infrared light of a wavelength range necessary for heating the ink can be efficiently and appropriately generated. Furthermore, in this case, the medium 50 and the like can be appropriately prevented from being heated to a high temperature by an infrared light of long wavelength, for example, by selectively generating the infrared light of a necessary wavelength. More specifically, the infrared irradiating portion 104 is, for example, an irradiator (LED irradiator) using an LED (infrared LED) that generates an infrared light, and irradiates an infrared light in which a wavelength is smaller than or equal to 3 μm with respect to the ink on the medium 50. In this case, the infrared light in which a wavelength is smaller than or equal to 3 μm is, for example, a near infrared light or a short wavelength infrared light. The near infrared light is, for example, an infrared light having the wavelength in a range of 0.75 μm to 1.4 μm. The short wavelength infrared light is, for example, an infrared light having the wavelength in a range of 1.4 μm to 3 μm.

Furthermore, irradiating the infrared light in which a wavelength is smaller than or equal to 3 μm means, for example, irradiating an infrared light in which the peak wavelength is smaller than or equal to 3 μm (e.g., 0.75 μm to 3 μm). Furthermore, the infrared irradiating portion 104 preferably irradiates the infrared light so that the intensity at the wavelength distant from the peak wavelength becomes sufficiently small. In this case, the infrared irradiating portion 104 generates, for example, an infrared light in which the peak wavelength is smaller than or equal to 3 μm and the intensity of a component in which the wavelength is 4 μm becomes smaller than or equal to 1/10 of the intensity at the peak wavelength. Moreover, the infrared irradiating portion 104 preferably, for example, irradiates an infrared light in which the entire full width at half maximum becomes smaller than or equal to 3 μm (e.g., 0.75 μm to 3 μm). According to such configuration, for example, the ink on the medium can be directly and selectively heated. Furthermore, consideration is made to using a laser element (infrared light LD) and the like that generates an infrared light, for example, for the semiconductor light source configuring the infrared irradiating portion 104. In this case, the infrared irradiating portion 104 preferably further has a configuration of expanding the irradiation range of the infrared light generated by the laser element. Consideration is made to using, for example, a beam expander, a barrel type lens (cylindrical lens), and the like for the configuration of expanding the irradiation range of the infrared light. Furthermore, in this case, consideration is made to expanding the irradiation range by expanding the beam in the sub-scanning direction parallel to the nozzle row direction in which the nozzles are lined in each inkjet head 102c to 102k, and irradiating the infrared light in one direction in which the light is collected in the main scanning direction, which is the moving direction at the time of the main scanning operation. According to such configuration, for example, the infrared light can be evenly and appropriately irradiated to a range of a constant area.

A relationship of the features of the ink used in the present example and the wavelength range of the infrared light generated by the infrared irradiating portion 104 will be described in further detail later. Furthermore, in the present example, the head unit 12 carries out the main scanning operation in both directions to one side and the other side in the main scanning direction. As also described above, in this case, the infrared light is irradiated with respect to the ink on the medium 50 by the infrared irradiating portion 104 on the backward side of the inkjet heads 102c to 102y in the moving direction of the head unit 12 of the plurality of infrared irradiating portions 104 in the head unit 12. In this case, the infrared irradiating portion 104 is, for example, preferably disposed at a position to be immediately after the head unit 12 in the scanning direction of the head unit 12. In an alternative embodiment of the configuration of the printing device 10, for example, the main scanning operation toward one side (one direction) of the main scanning direction may be carried out. In this case, for example, the infrared irradiating portion 104 may be disposed only at the position to become the backward side of the inkjet heads 102c to 102k at the time of the main scanning operation. Furthermore, the infrared irradiating portion 104 preferably irradiates the infrared light even to a position where the position in the sub-scanning direction is shifted from the inkjet heads 102c to 102k in addition to a range where the position overlaps with the inkjet heads 102c to 102k in the sub-scanning direction. According to such configuration, for example, the time until the ink is completely dried can be reduced by more reliably irradiating the infrared light with respect to the ink on the medium 50. Furthermore, in an alternative embodiment of the configuration of the printing device 10, an infrared irradiating portion other than the infrared irradiating portions 104 of the head unit 12 may be further used. In this case, for example, consideration is made to further disposing an infrared irradiating portion for post-heating on the downstream of the inkjet heads 102c to 102k in a transport direction of the medium 50. According to such configuration, for example, the time until the ink is completely dried can be more appropriately reduced.

The platen 14 is a table-like member that supports the medium 50, and supports the medium 50 so as to face the head unit 12. Furthermore, in the present example, the platen 14 interiorly accommodates the print heater 20, the pre-heater 22, and the after-heater 24. The guide rail 16 is a rail member that guides the movement of the head unit 12 at the time of the main scanning operation. The main scanning driver 18 is a driving unit that drives the main scanning operation and the sub-scanning operation by the printing device 10. At the time of the main scanning operation, the scanning driver 18, for example, causes each inkjet head of the head unit 12 to eject the ink according to the image to be printed while moving the head unit 12 along the guide rail 16. Furthermore, a region facing the head unit 12 in the medium 50 is changed by carrying out the drive of the sub-scanning operation between the main scanning operations. In this case, the sub-scanning operation is, for example, an operation of relatively moving the medium 50 in the sub-scanning direction with respect to the head unit 12. The scanning driver 18 carries out the drive of the sub-scanning operation by, for example, driving a roller (not shown) and the like and moving the medium 50 in a transport direction parallel to the sub-scanning direction.

The print heater 20 is a heater that heats the medium 50 at a position facing the head unit 12. The ink on the medium 50, for example, can be more efficiently heated by using the print heater 20. Furthermore, in this case, the configuration of the printing device 10 of the present example can be considered as a configuration of drying the ink by simultaneously using the infrared irradiating portion 104 and the print heater 20.

When the heating temperature with the print heater 20 is high, for example, the inkjet head in the head unit 12 is heated, and thus the problem of nozzle clogging and the like easily occurs. In this case, the nozzle clogging is, for example, a case in which the nozzle in the ejection head such as the inkjet head is clogged by the drying of ink. Thus, the heating temperature by the print heater 20 is preferably lower than or equal to 70° C. Furthermore, in the present example, the ink can be efficiently heated using the infrared irradiating portion 104, and the like, as described above. Thus, the heating temperature by the print heater 20 is more preferably set to a sufficiently low temperature for the purpose of suppressing the influence of environmental temperature, making the temperature of the medium 50 constant, and the like. In this case, the print heater 20, for example, carries out heating at a temperature (e.g., about lower than or equal to 50° C.) closer to the room temperature with respect to the entire medium 50 (entire region facing the print heater 20). Furthermore, the heating temperature of the medium 50 by the print heater 20 is preferably lower than or equal to 40° C., and more preferably lower than or equal to 35° C. According to such configuration, for example, the influence of environmental temperature and the like can be appropriately suppressed while suppressing the problem of nozzle clogging, and the like.

Furthermore, the pre-heater 22 is a heater that heats the medium 50 on the upstream of the head unit 12 in the transport direction. The initial temperature of the medium 50 can be appropriately adjusted before reaching the position of the head unit 12 by using the pre-heater 22. Furthermore, in this case, the heating temperature of the medium 50 by the pre-heater 22 is also preferably set to a sufficiently low temperature (e.g., lower than or equal to 50° C., preferably lower than or equal to 40° C., more preferably lower than or equal to 35° C.) for the purpose of, for example, suppressing the influence of environmental temperature, and the like. The after-heater 24 is a heater that heats the medium 50 on the downstream of the head unit 12 in the transport direction. For example, the ink can be more reliably dried before the printing is completed by using the after-heater 24. The heating temperature of the medium 50 by the after-heater 24 is considered to be, for example, set to about 30° C. to 50° C. Furthermore, the after-heater 24 can be considered as, for example, a heater for post-heating, and the like for completely drying the ink on the medium 50. In this case, the heating temperature of the after-heater 24 may be set to a high temperature of a certain extent in a range lower than or equal to a heatproof temperature of the medium 50 to be used.

As described above, in the present example, the ink is dried using the infrared irradiating portion 104, and the like. In this case, the preventing of smearing and the drying with respect to the layer of the ink is carried out mainly by the irradiation of the infrared light by the infrared irradiating portion 104, and the like. Thus, some or all of the print heater 20, the pre-heater 22, and the after-heater 24 may be omitted depending on the environment of using the printing device 10 and the desired quality of printing. Furthermore, consideration is made to using known various heating means for the print heater 20, the pre-heater 22, and the after-heater 24. More specifically, for example, a heat transfer heater, a warm air heater, an infrared light heater, and the like can be suitably used for the print heater 20, the pre-heater 22, and the after-heater 24. Furthermore, in the present example, the print heater 20, the pre-heater 22, and the after-heater 24 can be considered as for example, an auxiliary drying means for further promoting the drying of ink. Moreover, in order to more reliably dry the ink before the printing is completed, for example, the warm air heater, the infrared light heater, and the like may be further disposed downstream of the head unit 12 in the transport direction. In this case, the infrared light heater is, for example, a heater for heating the medium 50 by generating an infrared light including a far infrared light. In this case, the warm air heater, the infrared light heater, and the like may be used in place of the after-heater 24. Furthermore, the print heater 20, the pre-heater 22, and the after-heater 24 are not limited to being disposed inside the platen 14, and for example, may be disposed on a mount disposed in the vicinity of the medium 50.

The controller 30 is, for example, a CPU of the printing device 10, and controls the operation of each unit of the printing device 10. According to the present example, for example, the printing with respect to the medium 50 can be appropriately carried out. Furthermore, a specific configuration of the printing device 10 is not limited to the configuration illustrated in FIGS. 1A and 1B, and may be variously modified. The various alternative embodiments of the configuration of the printing device 10 will be described in further detail later.

Next, the ink used in the present example and the feature of the infrared irradiating portion 104 will be described in further detail. As described above, in the present example, the evaporation drying ink that the ink itself generates heat by the irradiation of the infrared light is used for the ink ejected from the inkjet heads 102c to 102k. Furthermore, such ink can be considered as, for example, instant drying type ink that contains a coloring material and a solvent, and that generates heat by the irradiation of the infrared light. In this case, generating heat by the irradiation of the infrared light means, for example, generating heat by absorbing the infrared light. Furthermore, in the present example, a liquid that generates heat by absorbing the infrared light is used for the solvent of the components of the ink. According to such configuration, for example, the ink can be caused to appropriately generate heat by the irradiation of the infrared light. Furthermore, more specifically, in the present example, an aqueous ink (aqueous inkjet ink) containing water as the solvent is used for the ink. In this case, for example, aqueous pigment ink, aqueous dye ink, or aqueous latex ink can be suitably used for the aqueous ink. Moreover, consideration is also made to using for example, a dispersed ink in which resin particles are dispersed in the aqueous solvent.

In the present example, the solvent is, for example, a liquid that melts or disperses other components in the ink. Furthermore, the solvent can be considered as, for example, a liquid used as a main component of the ink. In this case, the main component of the ink is, for example, component contained in the ink at a largest weight ratio.

In correspondence with using the aqueous ink, the infrared irradiating portion 104 generates an infrared light in a wavelength range of causing the water to generate heat in the present example. The wavelength range of causing the water to generate heat is, for example, a wavelength range of causing the water to appropriately generate heat by overlapping an absorption wavelength of the water (infrared light absorption wavelength region of the water itself). The wavelength range of causing the water to generate heat can be considered as, for example, a wavelength range (vicinity of absorption band) having a peak wavelength that substantially coincides with the absorption wavelength of the water, the wavelength range strongly absorbed by the water itself, and the like. In this case, for example, any one of the absorption wavelength of the water is preferably contained in the full width at half maximum of a light emitting wavelength of the infrared irradiating portion 104, More specifically, the infrared light of the wavelength range for causing the water to generate heat can be considered as, for example, an infrared light in which the peak wavelength is in the range of 2.65 µm to 2.87 µm or 1.86 µm to 1.94 µm. According to such configuration, for example, the ink on the medium 50 can be efficiently and appropriately heated by the infrared light generated by the infrared irradiating portion 104. Furthermore, for example, the viscosity of the ink on the medium 50 thus can be sufficiently increased in a short time, and the smearing of the ink can be appropriately prevented from occurring. Moreover, in this case, the ink can be appropriately heated without excessively raising the temperature of the medium 50, and the like using the infrared light of short wavelength in the wavelength range adapted to the feature of the solvent of the ink. Thus, according to the present example, for example, the ink can be appropriately dried before the smearing occurs while preventing the nozzle clogging from occurring, and the like in the inkjet heads 102c to 102k by the temperature rise of the medium 50. Thus, for example, printing at high quality can be appropriately carried out.

In the drying of the ink (color ink) carried out by the infrared irradiating portion 104, for example, the ink merely needs to be dried to an extent the viscosity of the ink is sufficiently increased in a range the purpose of suppressing smearing can be achieved. Thus, the irradiation of the infrared light by the infrared irradiating portion 104 can also be considered as, for example, an operation of volatilizing and removing at least one part of the solvent contained in the ink by irradiating the infrared light with respect to the ink attached to the medium 50. Furthermore, in the present example, the ink can be directly heated by drying the ink using the infrared irradiating portion 104, as opposed to, for example, the case of indirectly heating the ink by heating the medium 50 with a general heater, and the like. Thus, according to the present example, for example, the viscosity of the ink can be sufficiently increased in a short time immediately after the landing of the ink on the medium 50, and the smearing can be appropriately suppressed. Furthermore, in this case, as the smearing of the ink can be appropriately suppressed, for example, the speed of printing can be appropriately increased.

The operation of drying the ink by the infrared irradiating portion 104 can be considered as, for example, an operation of irradiating the infrared light on the layer of ink formed on the surface of the medium 50 by the inkjet heads 102c to 102k so that the infrared light is directly absorbed by the solvent in the ink, and the ink is directly and selectively heated. In this case, the ink is heated, for example, so that the temperature of the ink on the medium 50 becomes higher than the temperature of the medium 50 by directly heating the ink. In this case, for example, the ink is heated so that the temperature of the ink becomes higher than 50° C. while suppressing the temperature of the medium 50 to lower than or equal to 50° C. Furthermore, in this case, the temperature of the medium 50 is preferably suppressed to lower than or equal to 40° C. The temperature of the ink is, for example, preferably heated to higher than or equal to 80° C. Moreover, in this case, the temperature rise of the medium 50 can be suppressed by directly and selectively heating the ink. When considered from such standpoint, the temperature rise of the medium 50 by the irradiation of the infrared light by the infrared irradiating portion 104 is, for example, preferably about lower than or equal to 10° C. Furthermore, the temperature rise of the medium 50 by the irradiation of the infrared light is preferably lower than or equal to 5° C.

In the present example, the viscosity of the ink is increased to at least a viscosity the smearing does not occur on the medium 50 by sufficiently heating the ink by the irradiation of the infrared light. When referring to the smearing not occurring on the medium 50, for example, this means that the smearing in question substantially does not occur according to the quality and the like desired in the printing. In this case, the temperature of the ink is preferably heated to a sufficiently high temperature so that the solvent can be appropriately volatilized and removed in a short time. More specifically, for example, consideration is also made to heating the ink to a temperature at which the solvent contained in the ink on the medium 50 boils. The temperature at which the solvent boils is, for example, a boiling temperature or a temperature higher than the boiling temperature. Furthermore, when using an aqueous ink having water as a main component as in the present example, the boiling point of the solvent is, for example, the boiling point of the water. According to such configuration, for example, the solvent in the ink can be evaporated in a short time, and the ink can have higher viscosity and can be solidified by heating the ink to a high temperature. Furthermore, for example, the smearing can be more appropriately suppressed. Moreover, in this case, for example, the ink can be efficiently heated, and thus for example, the power consumption necessary for drying the ink can also be reduced, and the like. In this case, the cumulative energy irradiated on the medium 50 is, for example, preferably set to about 0.1 to $5/cm^2$. According to such configuration, for example, the viscosity of the ink on the medium 50 can be appropriately increased in a short time.

Furthermore, in this case, the medium 50 in which the proportion of water (moisture percentage) in the composition is small is preferably used to suppress the temperature rise of the medium 50 by the irradiation of the infrared light. In this case, for example, the medium 50 and the like in which the proportion of water is smaller than or equal to 15% by weight (preferably, smaller than or equal to 10% by weight) can be suitably used. More specifically, for example, the medium 50 made of plastic such as PET, metal, glass, or chemical fiber, and the like can be suitably used for the medium 50. When using such medium 50, the medium 50 barely contains moisture, and thus even if the infrared light of a wavelength for causing the water to generate heat is irradiated, the rise in temperature of the medium 50 can be appropriately suppressed. The medium 50 in which the moisture percentage is about 10% can, practically, be suitably used. In this case, for example, consideration is made to using the medium 50 of a natural fiber in which the moisture percentage is about 10%, and the like.

As described above, the problem of nozzle clogging, and the like easily occurs when the temperature of the medium 50 becomes a high temperature. When the temperature of the medium 50 becomes a high temperature, the problem of heatproof temperature, and the like of the medium 50 may occur. However, the problem may be unlikely to occur even if the temperature of the medium 50 is raised to a certain extent depending on the ink to be used and the property of the medium 50. Thus, in such a case, consideration is made to using the medium 50 having a higher moisture percentage. More specifically, in this case, consideration is made to using, for example, a paper medium 50 (e.g., regular paper).

Figure 2A:
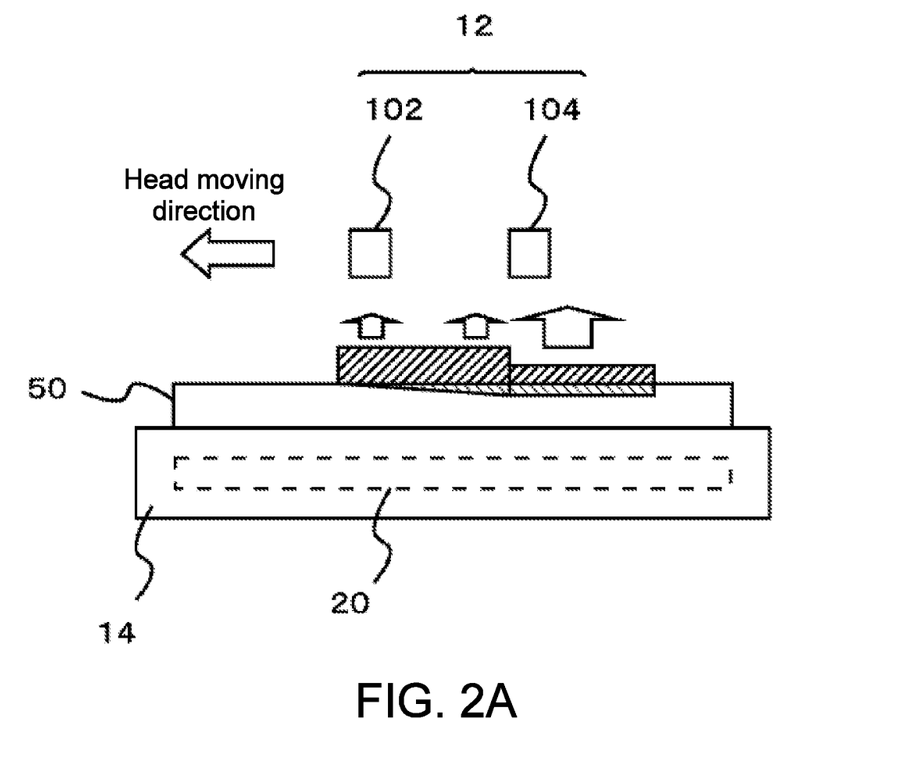
FIG. 2A shows an operation of drying the ink using an infrared irradiating portion 104 in a simplified manner.
Figure 2B:
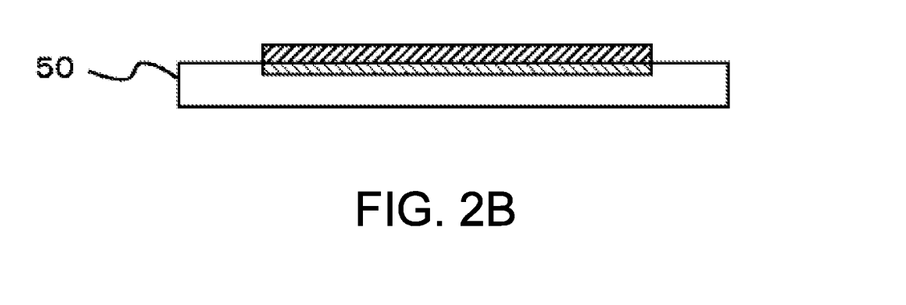
FIG. 2B shows a cross-section of a medium 50 after printing in a simplified manner.

Next, the operation of printing carried out in the present example will be described in further detail. FIGS. 2A and 2B are views describing the operation of printing carried out in the present example, and shows one example of the operation of printing when using a permeable medium 50 in a simplified manner. In this case, the permeable medium 50 is a medium 50 having a property in which the ink permeates to the interior of the medium 50. Consideration is made to using a fabric medium 50 (e.g., fabric medium 50 of chemical fiber, etc.) for the medium 50.

FIG. 2A is a view (view of model of drying process) showing the operation of drying the ink using the infrared irradiating portion 104 in a simplified manner, and shows one example of the operation of drying the ink at the time of the main scanning operation of moving the head unit 12 in the direction of the arrow indicated as the head moving direction in the figure. FIG. 2B is a view showing a cross-section of the medium 50 after printing in a simplified manner. Furthermore, in FIG. 2A, the inkjet heads 102c to 102k (see FIG. 1A) are collectively illustrated as the inkjet head 102 in the figure for the sake of simplification of the illustration.

As also described above, in the present example, the ink on the medium 50 is dried by simultaneously using the infrared irradiating portion 104 and the print heater 20. In this case, the infrared irradiating portion 104 irradiates the infrared light after the inkjet head 102 has passed, as shown in the figure, with respect to the ink at each position of the medium 50. In this case, only the heating of a relatively low temperature by the print heater 20 is carried out at the position facing the inkjet head 102 in the medium 50. Thus, according to the present example, for example, the temperature of the nozzle surface of the inkjet head 102 can be appropriately prevented from rising by the influence of heating (radiant heat). Furthermore, in this case, the ink at each position of the medium 50 is heated to a high temperature by the infrared irradiating portion 104 after the inkjet head 102 has passed. Thus, the solvent in the ink is mainly evaporated in a region after the inkjet head 102 has passed. Thus, according to such configuration, for example, the evaporated solvent can be appropriately prevented from aggregating at the nozzle surface of the inkjet head 102. Furthermore, the ejection of the ink by the inkjet head 102 thus can be more stabilized.

When using the permeable medium 50, for example, if the medium 50 is merely heated with the heater, and the like of the conventional configuration, the ink may permeate into the medium 50 and the amount of ink remaining on the surface of the medium 50 and the vicinity of the surface may reduce, and the density of the printing may lower, as described above. In the present example, on the other hand, when using the infrared irradiating portion 104, the ink can be rapidly dried in the vicinity of the surface of the medium 50 before a great amount of ink permeates into the medium 50 immediately after landing on the medium 50. Thus, according to the present example, even when using the permeable medium 50, for example, the ink can be dried in a state the ink is permeated by a small amount with respect to the interior of the medium 50, as shown in FIG. 2B. Thus, for example, a clear printing at high density can be more appropriately carried out while leaving a great amount of ink in the vicinity of the surface of the medium 50. Furthermore, in this case, various problems that arise when the ink is permeated into the medium 50 can be prevented as the permeated amount of solvent (moisture etc.) of the ink and the remaining time in the interior of the medium 50 can be reduced. For example, when using the paper medium 50, and the like, cockling, curl, and the like can be appropriately prevented.

As also described above, in the present example, the influence of the radiant heat of heating and the evaporated solvent on the inkjet head 102 can be appropriately prevented in addition to drying the ink in a short time according to the configuration of irradiating the infrared light by the infrared irradiating portion 104 after the inkjet head 102 has passed with respect to the ink at each position of the medium 50. In order to more appropriately obtain such effect, for example, it is preferable to sufficiently consider the range of irradiating the infrared light by the infrared irradiating portion 104 in addition to shifting the positions of the inkjet head 102 and the infrared irradiating portion 104 in the main scanning operation. More specifically, in this case, for example, the irradiating direction of the infrared light by the infrared irradiating portion 104 is preferably controlled so that the infrared light is not irradiated directly or indirectly on the nozzle surface or the nozzle row of the inkjet head 102. In this case, for example, the directivity, and the like of the irradiation of the infrared light by the infrared irradiating portion 104 are preferably adjusted so that the intensity of the infrared light in the direction toward the inkjet head 102 becomes sufficiently small and the reflected component of the infrared light reflected by the medium 50 and directed toward the nozzle surface of the inkjet head 102 becomes sufficiently small.

Figure 3:
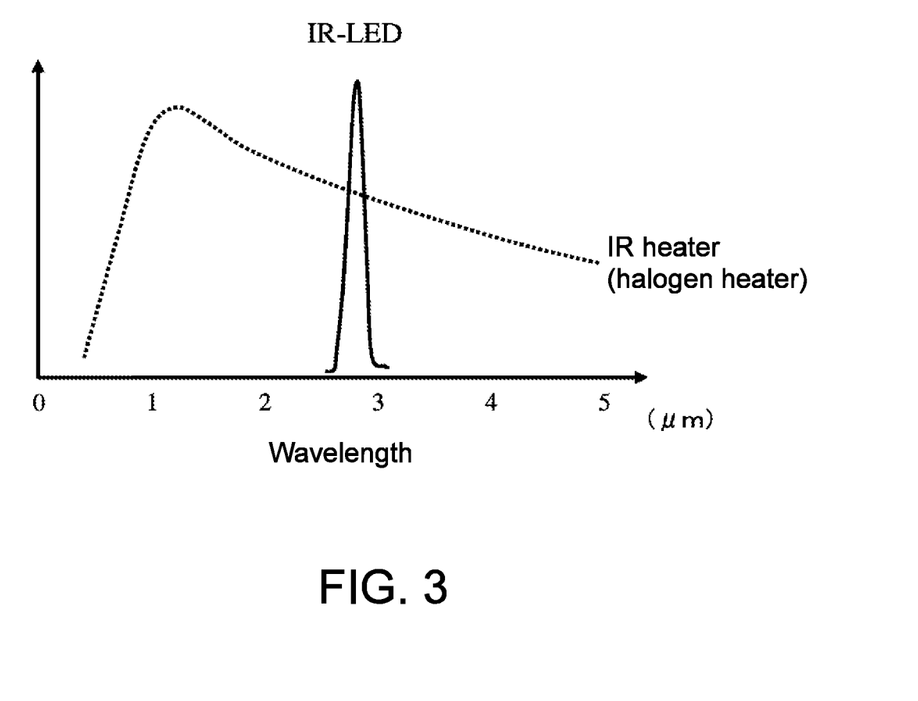
FIG. 3 is a view showing one example of a wavelength range of the infrared light irradiated by the infrared irradiating portion 104.

Next, the wavelength range, and the like of the infrared light irradiated by the infrared irradiating portion 104 will be described in further detail. FIG. 3 is a view showing one example of the wavelength range of the infrared light irradiated by the infrared irradiating portion 104, and shows one example of the intensity distribution of the infrared light irradiated by the infrared irradiating portion 104 in comparison with an example of the intensity distribution of the infrared light generated by a known IR heater. More specifically, in the case shown in the figure, the intensity distribution of the infrared light irradiated by the infrared irradiating portion 104 is an intensity distribution of when using an infrared LED (IR-LED) that generates the infrared light in the infrared irradiating portion 104. Furthermore, the intensity distribution of the infrared light generated by the IR heater is an intensity distribution of when using a halogen heater as the IR heater.

When generating the infrared light with the IR heater such as the halogen heater, the infrared light of a wide wavelength range is usually generated as shown in the figure. When using the infrared light of such wide wavelength range in the printing device 10, for example, the medium 50 and the like are also heated to a high temperature other than the ink by the influence of a component of long wavelength. On the other hand, when generating the infrared light by the semiconductor light source such as the infrared LED, and the like, the intensity distribution of the infrared light becomes a distribution concentrated in a narrow wavelength range having a predetermined peak wavelength (center of light emission), as shown in the figure. In this case, the solvent can be directly and selectively heated by matching the peak wavelength of the infrared light to the absorption wavelength of the solvent (e.g., water) of the ink. Furthermore, for example, the ink can be appropriately and sufficiently heated while suppressing the temperature rise, and the like of the medium 50.

As described above, when using water for the solvent of the ink, the solvent can be appropriately heated by using, for example, the infrared light in which the peak wavelength is in the range of 2.65 μm to 2.87 μm or 1.86 μm to 1.94 μm. Of such wavelength ranges, the wavelength range on the long wavelength side is the wavelength range corresponding to about 3500 $cm^{-1}$ (=2.86 μm), which is the absorption band of the water. Such absorption band is the absorption band corresponding to the hydroxyl group (—OH group) in the water.

Consideration is made to using a liquid including the hydroxyl group other than water for the solvent of the ink. Consideration is made to using, for example, various types of alcohols and ethylene glycol for such medium. In this case as well, the solvent has an optical property of absorbing the infrared light in which the wavelength is around 2.8 μm, similar to the water. Thus, the wavelength range of the infrared light generated by the infrared irradiating portion 104 can appropriately heat the ink even when using the liquid other than water including the hydroxyl group for the medium in addition to when using water for the medium by being set to around 2.8 μm. More specifically, in this case, the infrared irradiating portion 104 preferably generates the infrared light in which the peak wavelength is in the range of 2.5 μm to 3.0 μm. The peak wavelength of the infrared light is more preferably 2.8 μm to 2.9 μm (e.g., about 2.86 μm). According to such configuration, for example, the ink on the medium 50 can be appropriately heated when using various solvents.

Xenon lamp, infrared lamp, and the like are also known other than the semiconductor light source for the light source for generating the infrared light. In this case as well, considering only the aspect of drying the ink, for example, such lamp may be disposed at a position on the backward side of the inkjet head at the time of the main scanning operation, and the lamp may be turned ON to rapidly dry the ink.

However, when such lamp is used, the conversion efficiency to the infrared light (infrared light effective to heat sensitivity) in the range efficiently absorbed by the ink lowers, and a great amount of visible light, and the like having low effectiveness to the heating of ink may be generated. In this case, it becomes difficult to selectively heat only the ink, and the temperature of the medium 50, the peripheral member, and the like may greatly rise. Furthermore, in this case, most of the input energy becomes heat, which is radiated through the medium 50, and the like. Thus, in this case, a loss of the energy becomes large, and a problem in that the usage efficiency of the energy used to dry the ink becomes low arises. Furthermore, when such lamp is used, the ON/OFF switch, and the like cannot be carried out at high speed, and thus for example, the temperature of the medium 50 may become an extremely high temperature if the infrared light is irradiated under the condition of drying the ink at high speed. Thus, in this case, it is particularly difficult to use the medium 50 of low heat resistance. Moreover, in this case, burn and color change may occur as the temperature of the medium 50 and the ink becomes a high temperature. Furthermore, when using a burnable medium 50 such as paper, for example, problems of ignition, burn and the like of the medium 50 may occur by overheat if the transportation of the medium 50 is stopped due to clogging (paper jam) of the medium 50 being transported, blackout, and the like.

In the present example, on the other hand, when irradiating the infrared light using the semiconductor light source such as the infrared LED, the infrared light of a narrow wavelength range is generated so that only the substance having a specific structure can be efficiently heated. Furthermore, for example, the ink can be efficiently heated while suppressing the temperature rise of the medium 50.

Furthermore, as described above, the peak wavelength of the infrared light generated by the infrared irradiating portion 104 is preferably matched with the absorption wavelength of the solvent of the ink. However, the peak wavelength of the infrared light generated by the infrared irradiating portion 104 and the absorption wavelength of the solvent of the ink may not necessarily completely match as long as it is a range the purpose of appropriately heating the ink can be achieved. For example, when using the water for the solvent of the ink, the infrared irradiating portion 104 may generate the infrared light under the condition the peak wavelength does not fall within either of the ranges of 2.65 µm to 2.87 µm and 1.86 µm to 1.94 µm depending on the specific ink to be used and the property of the medium 50. In this case, for example, consideration is made to using the infrared LED (mid-infrared LED), and the like having a peak wavelength in a mid-wavelength infrared light range in which the wavelength is greater than 3 µm.

Next, a supplementary explanation related to various features described above will be made. The specific configuration of the printing device 10 is not limited to the configuration described above, and may be variously modified. For example, the configuration of when the infrared irradiating portion in the head unit 12 (see FIGS. 1A and 1B) is arranged on both sides or one side of the main scanning direction with respect to the inkjet head has been mainly described above. However, consideration is made to further disposing the infrared irradiating portion at other positions as well. In this case, for example, the infrared irradiating portion may be further disposed downstream of the transport direction of the medium with respect to the inkjet head in the head unit 12. Furthermore, in the description made above, the configuration of a serial scheme for causing the head unit 12 to carry out the main scanning operation has been mainly described for the configuration of the printing device 10. However, consideration is also made to using the line printer scheme configuration for the configuration of the printing device 10. In this case, for example, the infrared light is irradiated with respect to the ink on the medium by disposing the infrared irradiating portion downstream of the transport direction of the medium with respect to the inkjet head in the head unit 12.

Furthermore, as described above, the effect of drying the ink in a short time by the irradiation of the infrared light is significant when carrying out printing with a fewer pass number (e.g., smaller than or equal to eight passes, preferably smaller than or equal to four passes, for example, one to four passes). Thus, the configuration of the present example can be considered as, for example, a configuration that enables high definition printing with a fewer pass number that has been difficult to realize in the conventional method due to the problem of smearing. However, consideration is made to carrying out printing with a greater pass number depending on the ink to be used for printing, the property of the medium, and the quality desired in the printing. More specifically, for example, when using an ink of slow drying speed, consideration is made to carrying out printing with a pass number greater than four passes. In this case, for example, the printing with a pass number of about smaller than or equal to 32 passes (e.g., 8 passes to 32 passes) is preferably carried out.

Furthermore, in the description made above, a case of using a permeable medium made of cloth such as fabric, paper and the like has been mainly described as one example of a medium to be used for the printing. In this case, for example, the printing can be appropriately carried out while suppressing the smearing even if the medium has permeability and does not include an image receiving layer. More specifically, in this case, for example, sewn product such as a T shirt, and various types of porous medium, and the like can be suitably used. Furthermore, in this case, for example, the direct printing (direct print) on the paper not including the image receiving layer, the fabric not subjected to a pre-process, and the like can be carried out, whereby the running cost of the printing can be greatly reduced.

Furthermore, the medium to be used is not limited thereto, and for example, using a medium including an image receiving layer can be considered. Moreover, the medium is not limited to a permeable medium, and an impermeable (non-absorbing) medium can also be used. In this case, for example, the printing can be appropriately carried out while suppressing the smearing even with respect to a medium to which the printing has been difficult to appropriately carry out as the problem of smearing became larger with the conventional configuration such as the impermeable PET, PC, and the like. More specifically, for example, the effect of preventing the smearing can be appropriately obtained by rapidly drying the ink on the medium even when using an impermeable plastic film, vinyl chloride sheet, and the like for the medium. Such media are not the sole cases, and various non-absorbing non-coat medium, and the like can also be used. Furthermore, the medium is not limited to a medium (medium for direct print) for directly obtaining the final result (printed manner) by ejecting the ink from the inkjet head, and consideration is also made to using a medium for transfer, and the like. In this case, the medium for transfer is, for example, a medium used in an application of transferring the layer of ink formed on the to-be-printed surface to another medium.

As described above, in the present example, the high definition printing can be carried out without causing smearing even when printing is carried out at a higher speed beyond the limit in the conventional method by using an ink containing a solvent that absorbs the infrared light of a predetermined wavelength range and generates heat. With regards to such aspect, consideration is made to enhancing the absorption efficiency of the infrared light by, for example, adding an infrared light absorbent instead of having the solvent to absorb the infrared light when focusing on drying the ink by the irradiation of the infrared light. However, many of the substances that can be used as the infrared light absorbent are substances indicating absorption of a certain extent even in a visible light region. Thus, when the infrared light absorbent other than a basic component of the ink is added, the color of the ink is influenced and a high definition color image may not be obtained. In the present example, on the other hand, the ink is heated by causing the solvent or the basic component of the ink to absorb the infrared light without using a special infrared light absorbent, and the like, as described above. According to such configuration, for example, the influence on the color of the ink due to the addition of an extra substance can be appropriately prevented. Thus, for example, a high definition color image can be more appropriately printed. Therefore, the configuration of the present example can also be considered as, for example, a configuration that enables a high definition, ultra-high speed printing without using a special infrared light absorbent.

Furthermore, a specific ink to be used in the printing device 10 can be variously modified. For example, the color of the ink is not limited to the ink of each color of CMYK, and consideration is made to further using an ink of each color of red (R), green (G), and blue (B). Furthermore, consideration is made to using inks of various colors for the ink of a specific color such as white color, pearl color, metallic color, ceramic color, fluorescent color, phosphorescent color, and the like. Moreover, the number of colors of ink to be used in the printing device 10 is not particularly limited.

INDUSTRIAL APPLICABILITY

The present disclosure can be suitably used for, for example, a printing device.

What is claimed is:

1. A printing device that carries out printing with respect to a medium, the printing device comprising:
an ejection head that ejects an ink to the medium; and
an infrared irradiating portion that irradiates an infrared light in which a wavelength is smaller than or equal to 3 μm with respect to the ink on the medium;
wherein the ejection head ejects the ink containing a solvent that generates heat by absorbing the infrared light; and
the infrared irradiating portion volatilizes and removes at least one part of the solvent in the ink by irradiating the infrared light with respect to the ink on the medium,
wherein the infrared irradiating portion generates the infrared light in which a peak wavelength is smaller than or equal to 3 μm, and an intensity of a component in which a wavelength is 4 μm is smaller than or equal to 1/10 of an intensity at the peak wavelength.

2. The printing device according to claim 1, wherein the infrared irradiating portion includes a semiconductor light source that generates the infrared light.

3. The printing device according to claim 1, wherein the infrared irradiating portion irradiates the infrared light with respect to the ink on the medium to heat the ink, so that a temperature of the ink on the medium becomes higher than a temperature of the medium.

4. The printing device according to claim 1, wherein the infrared irradiating portion irradiates the infrared light with respect to the ink on the medium to heat the ink, so that a temperature of the ink becomes higher than 50° C. while suppressing a temperature of the medium to lower than or equal to 50° C.

5. The printing device according to claim 1, wherein the infrared irradiating portion irradiates the infrared light with respect to the ink on the medium to heat the ink on the medium up to a temperature that the solvent contained in the ink on the medium boils.

6. The printing device according to claim 1, wherein the solvent is water; and
the infrared irradiating portion generates the infrared light of a wavelength range that causes water to generate heat.

7. The printing device according to claim 6, wherein the medium is a medium in which a proportion of water is smaller than or equal to 15% by weight.

8. The printing device according to claim 1, wherein the solvent is a liquid containing a hydroxyl group; and
the infrared irradiating portion generates the infrared light in which a peak wavelength is in a range of 2.5 μm to 3.0 μm.

9. A printing method that carries out printing with respect to a medium, the printing method comprising:
providing an ejection head that ejects an ink to the medium;
providing an infrared irradiating portion that irradiates an infrared light in which a wavelength is smaller than or equal to 3 μm with respect to the ink on the medium;
ejecting the ink containing a solvent that generates heat by absorbing the infrared light by the ejection head; and
volatilizing and removing at least one part of the solvent in the ink by irradiating the infrared light with respect to the ink on the medium from the infrared irradiating portion;
wherein the infrared irradiating portion generates the infrared light in which a peak wavelength is smaller than or equal to 3 and an intensity of a component in which a wavelength is 4 μm is smaller than or equal to 1/10 of an intensity at the peak wavelength.

* * * * *